US012783814B2

(12) United States Patent
Dey et al.

(10) Patent No.: US 12,783,814 B2
(45) Date of Patent: Nov. 3, 2026

(54) SYSTEM AND METHOD FOR ASSESSING AND ENHANCING QUALITY OF PROMPTS IN GENERATIVE AI-DRIVEN SOFTWARE CODING

(71) Applicant: ACCENTURE GLOBAL SOLUTIONS LIMITED, Dublin (IE)

(72) Inventors: Kuntal Dey, Rampurhat (IN); Samdyuti Suri, Faridabad (IN); Sankar Narayan Das, Barrackpore (IN); Kapil Singi, Bangalore (IN); Vibhu Saujanya Sharma, Bangalore (IN); Vikrant Kaulgud, Bangalore (IN); Teresa Sheausan Tung, Los Angeles, CA (US); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 121 days.

(21) Appl. No.: 19/013,935

(22) Filed: Jan. 8, 2025

(65) Prior Publication Data

US 2026/0195538 A1 Jul. 9, 2026

(51) Int. Cl.
*G06F 40/20* (2020.01)
*G06F 40/30* (2020.01)

(52) U.S. Cl.
CPC .................................... *G06F 40/30* (2020.01)

(58) Field of Classification Search
CPC .......... G06F 40/20; G06F 40/30; G06F 40/35; G06N 3/0475; G06N 3/042
See application file for complete search history.

(56) References Cited

U.S. PATENT DOCUMENTS 12,585,896 B1 * 3/2026 Maghakian ............. G06F 40/58
12,632,660 B1 * 5/2026 Rongali ................ G06F 40/289
(Continued)

OTHER PUBLICATIONS

Lilian Weng, Prompt Engineering, Lil'Log, Mar. 15, 2023, "https://lilianweng.github.io/posts/2023-03-15-prompt-engineering/", Downloaded from the Internet on Jan. 6, 2025.
(Continued)

*Primary Examiner* — Daniel Abebe
(74) *Attorney, Agent, or Firm* — Mannava & Kang, P.C.

(57) ABSTRACT

System and method for assessing and enhancing quality of prompts in generative AI-driven software coding is disclosed. The method includes, receiving a user input, wherein the user input comprises at least one keyword associated with a task, predicting an intent of the user input based on the at least one keyword, the task, and a context of the at least one keyword, and predicting a plurality of target elements applicable to the user input based on the predicted intent, wherein the plurality of target elements comprise entities and actions in the user input. The method further includes, validating an impact of the predicted plurality of target elements on a task performance using a simulation performance model, determining an input a quality of the user input based on results of validation, determining an appropriate set of target elements among the plurality of target elements for performing the task based on the performance score, generating a plurality of recommendations for the user input based on the appropriate set of target elements, and outputting the generated plurality of recommendations.

20 Claims, 4 Drawing Sheets

(56) References Cited

U.S. PATENT DOCUMENTS

| | | | | |
|---|---|---|---|---|
| 2023/0217057 | A1* | 7/2023 | Casimiro | H04N 21/42203<br>725/135 |
| 2023/0297484 | A1* | 9/2023 | Kabra | G06F 11/3409<br>726/21 |
| 2024/0177710 | A1* | 5/2024 | Kumar Saha | G06F 40/30 |
| 2025/0191585 | A1* | 6/2025 | Su | G06F 40/58 |
| 2025/0258998 | A1* | 8/2025 | Villa | G06N 3/08 |
| 2026/0057243 | A1* | 2/2026 | Brown | G06N 3/094 |
| 2026/0080178 | A1* | 3/2026 | Schillace | G06F 40/30 |
| 2026/0093595 | A1* | 4/2026 | Ray | G06F 11/3414 |
| 2026/0111678 | A1* | 4/2026 | Mohseni | G06Q 50/34 |

OTHER PUBLICATIONS

Zhensu Sun, Xiaoning Du, Fu Song, Shangwen Wang, Mingze Ni, Li Li, David Lo, Don't Complete It! Preventing Unhelpful Code Completion for Productive and Sustainable Neural Code Completion Systems, Arxiv, ACM Trans. Softw. Eng. Methodol., vol. 1, No. 1, Article, Aug. 2022, "https://arxiv.org/pdf/2209.05948".

* cited by examiner

SYSTEM AND METHOD FOR ASSESSING AND ENHANCING QUALITY OF PROMPTS IN GENERATIVE AI-DRIVEN SOFTWARE CODING

FIELD OF THE INVENTION

The present disclosure generally relates to the field of prompt engineering and more particularly to a system and a method for assessing and enhancing quality of prompts in generative artificial intelligence-driven software coding.

BACKGROUND

Generative AI (GenAI) refers to artificial intelligence models and techniques specifically designed to generate new content including, text, images, code, music, or other forms of creative output. GenAI may create novel content based on prompts, and patterns and structures learned during training of the GenAO models. A prompt is essentially the input or instruction given to a GenAI model, which then generates the corresponding output based on that input.

GenAI has rapidly become a powerful tool in the field of software development, helping developers automate, accelerate, and optimize many aspects of the software coding process. For example, GenAI models are being used to generate entire functions or code snippets based on natural language prompts or context within a project. Even though GenAI offers various advantages in developing the software, developers often face challenges related to prompt quality when using GenAI for software coding tasks. That is, the way a prompt is written may significantly impact the output/response of the GenAI model. For example, broad and/or ambiguous prompts may confuse the GenAI model, leading to unwanted, unclear or incomplete code. Further, prompts with insufficient context and/or unclear or vague instructions may result in an inefficient or incorrect output code.

Various techniques are developed to improve the quality of the GenAI response in software coding. One of the solutions include providing a catalog of patterns for software engineering and exploring prompt patterns that have been applied to improve requirements elicitation, rapid prototyping, code quality, deployment, and testing. In this approach, the catalog organizes the patterns (established solutions or approaches) by categorizing them based on the specific problems they solve, for example, debugging, optimizing performance, etc., and the prompt patterns specific ways of phrasing instructions to the GenAI models. However, the existing solutions fail to assess the quality of the prompts for a given task and fail to improve the quality of the prompt. Further, the conventional methods of quality assessment often involve lengthy and resource-intensive cycles of execution and testing. Such processes are costly, time-consuming, and hence inefficient.

SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

A system for assessing and enhancing quality of prompts in generative artificial intelligence-driven software coding is disclosed. The system includes, a processor, and a memory communicably coupled to the processor, wherein the memory comprises processor-executable instructions which, when executed by the processor, cause the processor to, receive a user input from a user via a conversational artificial intelligence interface, wherein the user input comprises at least one keyword associated with a task, predict an intent of the user input based on the at least one keyword, the task, and a context of the at least one keyword, predict a plurality of target elements applicable to the user input based on the predicted intent, wherein the plurality of target elements comprise entities and actions in the user input, validate an impact of the predicted plurality of target elements on a task performance using a simulation performance model and a historical performance model, determine an input a quality of the received user input based on results of validation, wherein the input quality is represented as a performance score of the plurality of elements in performing the task, determine an appropriate set of target elements among the plurality of target elements for performing the task based on the performance score, generate a plurality of recommendations for the user input based on the appropriate set of target elements, and output the generated plurality of recommendations for the user input on a user interface of a user device.

Further disclosed is a method for assessing and enhancing quality of prompts in generative artificial intelligence-driven software coding is disclosed. The method includes, receiving a user input from a user via a conversational artificial intelligence interface, wherein the user input comprises at least one keyword associated with a task, predicting an intent of the user input based on the at least one keyword, the task, and a context of the at least one keyword, and predicting a plurality of target elements applicable to the user input based on the predicted intent, wherein the plurality of target elements comprise entities and actions in the user input. The method further includes, validating an impact of the predicted plurality of target elements on a task performance using a simulation performance model and a historical performance model, determining an input a quality of the received user input based on results of validation, wherein the input quality is represented as a performance score of the plurality of elements in performing the task, determining an appropriate set of target elements among the plurality of target elements for performing the task based on the performance score, generating a plurality of recommendations for the user input based on the appropriate set of target elements, and outputting the generated plurality of recommendations for the user input on a user interface of a user device.

Further disclosed is a non-transitory computer readable medium including a processor-executable instructions that cause a processor to, receive a user input from a user via a conversational artificial intelligence interface, wherein the user input comprises at least one keyword associated with a task, predict an intent of the user input based on the at least one keyword, the task, and a context of the at least one keyword, predict a plurality of target elements applicable to the user input based on the predicted intent, wherein the plurality of elements comprise entities and actions in the user input, validate an impact of the predicted plurality of target elements on a task performance using a simulation performance model and a historical performance model, determine an input quality of the received user input based on results of validation, wherein the input quality comprises a performance score of the plurality of elements in performing the task, determine an appropriate set of target elements among the plurality of target elements for performing the task based on the performance score, generate a plurality of recommendations for the user input based on the appropriate set of target elements, and output the generated plurality of recommendations for the user input on a user interface of a user device.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features of the present disclosure will be apparent from the description and drawings, and from the claims.

BRIEF DESCRIPTION OF DRAWINGS

Various embodiments in accordance with the present disclosure will be described with reference to the drawings, in which.

Like reference numbers and designations in the various drawings indicate like elements.

DETAILED DESCRIPTION

Figure 1:
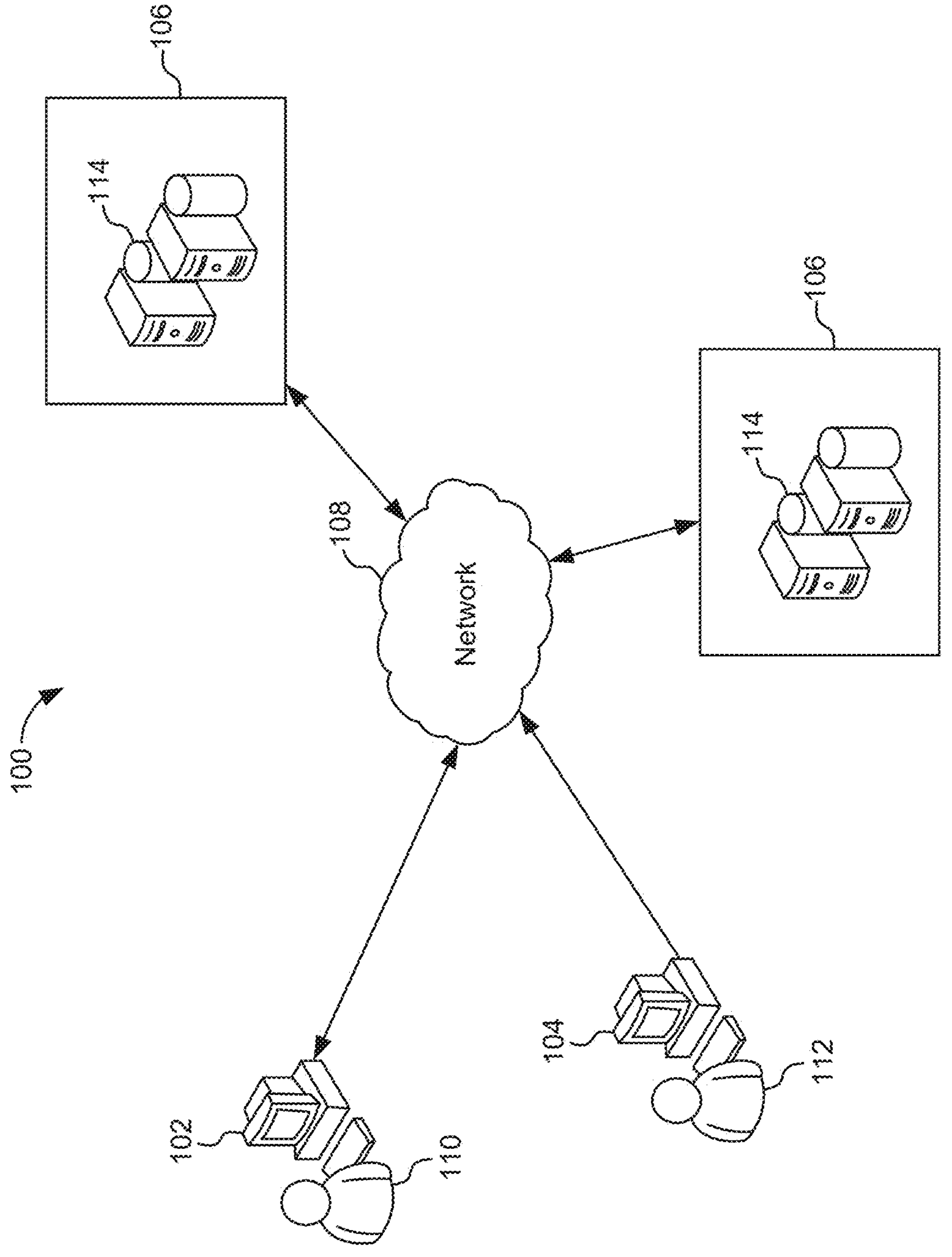
FIG. 1 depicts an example environment that can be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A. and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

Embodiments of the present disclosure disclose a system and a method for assessing and enhancing quality of prompts in generative artificial intelligence-driven software coding. More specifically, the system and corresponding method evaluates the quality of a prompt in relation to a specific task and/or GenAI engine. The system addresses various scenarios by comparing different prompt configurations and assessing the quality of each prompt configuration. Based on the evaluation, the system selects the best prompt configuration and suggests the best configuration to the user or assists the user in creating an optimal prompt configuration. Hence, the proposed system and method enables efficient prompt quality assessment without going through an expensive and time-consuming cycles of execution and testing which often involve extensive tests and evaluations.

FIG. 1 depicts an example environment 100 that can be used to execute implementations of the present disclosure. In some examples, the example environment 100 enables users associated with respective systems to input prompts to generate content (software codes for example) by invoking a trained language model in accordance with implementations of the present disclosure. The example environment 100 includes computing devices 102 and 104, back-end systems 106, and a network 110. In some examples, the computing devices 102 and 104 are used by respective users 114 and 116 to log into and interact with the platforms and running applications according to implementations of the present disclosure.

In the depicted example, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems (e.g., the back-end systems 106). In some examples, the network 110 may include a wired and/or a wireless communications link. For example, mobile computing devices, such as smartphones can utilize a cellular network to access the network 110.

In the depicted example, the back-end systems 106 each include at least one server system 120. In some examples, the at least one server system 120 hosts one or more computer implemented services that users can interact with by using computing devices. For example, components of enterprise systems and applications can be hosted on one or more of the back-end systems 106. In some examples, a back-end system can be provided as an on-premises system that is operated by an enterprise or a third-party taking part in cross-platform interactions and data management. In some examples, a back-end system can be provided as an off-premises system (e.g., cloud or on-demand) that is operated by an enterprise or a third-party on behalf of an enterprise.

In some examples, the computing devices 102 and 104 each include computer-executable applications executed thereon. In some examples, the computing devices 102 and 104 each include a web browser application executed thereon, which can be used to display one or more web pages of platform running applications. In some examples, each of the computing devices 102 and 104 can display one or more GUIs that enable the respective users 114 and 116 to interact with the computing platform. In accordance with implementations of the present disclosure, the back-end systems 106 may host enterprise applications or systems that require data sharing and data privacy. In some examples, the computing device 102 and/or the computing device 104 can communicate with the back-end systems 106 over the network 110.

In some implementations, at least one of the back-end systems 106 may be implemented in a cloud environment that includes at least one server system 120. In the example of FIG. 1, the back-end server 106 may represent various forms of servers including, but not limited to, a web server, an application server, a proxy server, a network server, and/or a server pool. In general, server systems accept requests for application services and provide such services to any number of client devices (for example, the computing device 102 over the network 110).

In some implementations, the back-end system 106 may be used to implement a foundation models, such as GenAI models, which are pretrained on vast amounts of data using unsupervised learning. The foundation models capture general language understanding and syntactic structure and generate coherent and contextually appropriate response based on a given prompt or input.

As described, the foundation models, the GenAI models, are trained on vast amount of data. Specifically, GenAI models for software coding are typically trained on vast amounts of code data to understand programming languages, syntax, structures, and problem-solving techniques. Hence, such models are specialized machine learning models trained to assist in writing, understanding, and improving software code. For such GenAI models, prompts serve as the instructions that guide the GenAI models in generating code or providing suggestions. Hence, the quality, the clarity, and the specificity of the prompt directly impact the usefulness of the output of the GenAI models. The embodiments of the present disclosure disclose a system and a method for assessing and enhancing quality of prompts in GenAI driven software coding.

Figure 2:
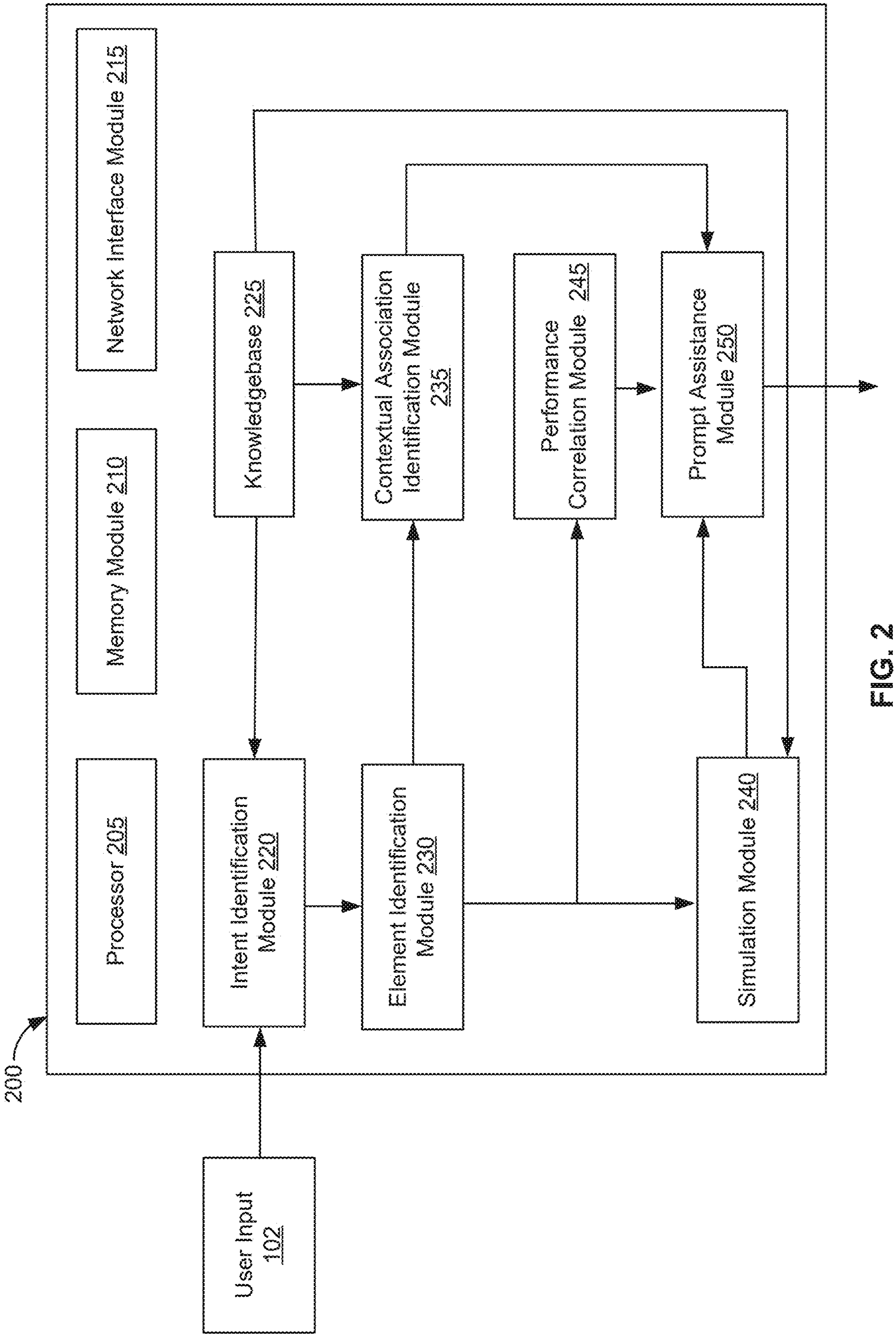
FIG. 2 depicts a block diagram of the system for assessing and enhancing quality of prompts in GenAI driven software coding, in accordance with an embodiment of the present disclosure.

FIG. 2 depicts a block diagram of the system for assessing and enhancing quality of prompts in GenAI driven software coding, in accordance with an embodiment of the present disclosure. As shown, the system 200 includes a processor 205, a memory module 210 and a network interface module 215. The system 200 may be implemented with the back-end system 106 and the network interface module 215 enables communication between the system 200 and the computing devices 102 and 104, for example. In one embodiment of the present disclosure, the system 200 further includes an intent identification module 220, a knowledgebase 225, an element identification module 230, a context association identification module 235, a simulation module 240, a performance correlation module 245 and a prompt assistance module 250.

In one embodiment, the system 200 is configured to receive a user input from a user device associated with a user, for example user device 102, via a conversational artificial intelligence interface. The conversational artificial intelligence interface as described refers to a user interface of a GenAI system and the user input refers to a prompt including at least one keyword associated with a task of generating a software code. An example user input (hereafter referred to as a prompt or input prompt) may be "Create a css file calc.css". Upon receiving the input prompt, the system 200 predicts the user's intent and identifies relevant elements (such as entities and actions). The system 200 then validates the relevant elements'impact on task performance using a simulation model or a historical performance model or both the simulation model and the historical performance model. Based on the validation, the system 200 determines the quality of the input prompt, selects the best set of elements, and generates recommendations, which are presented to the user on the user device 102. The manner in which the system 200 performs the above steps is described in further detail below.

As described, upon receiving the input prompt, the intent identification module 220 determines an intent of the input prompt. The intent as described herein may refer to a task or objective, and hence identification of intent may include identification of task name or the objective or both the task name and the objective. In an embodiment, the intent is determined based on the at least one keyword, the task, and a context of the at least one keyword. Further, the intent identification module 220 utilizes knowledge artifacts stored in the knowledgebase 225, wherein the knowledgebase 25 may be an internal knowledgebase of the system 200 or may be an external knowledgebase. Upon receiving the input prompt, the intent identification module 220 maps the at least one keyword, the task, and the context from the input prompt to corresponding knowledge artifacts that are pre-stored in either the internal or the external knowledge database 225. The knowledge artifacts may include various elements such as keywords, associated tasks, and the context in which the keywords or tasks are used.

Further, the intent identification module 220 calculates the similarity between the input prompt and the corresponding knowledge artifacts. The similarity assessment is based on how well the keywords, task, and context in the input prompt align with the stored knowledge. In an embodiment, a similarity metric score is computed to quantify alignment or the similarity. The metric can include multiple factors, such as entity-action overlap score, which measures how well the input prompt matches predefined actions or entities in the knowledgebase. For example, the entity-action overlap score may be determined based on the number of overlapping actions, that is, by comparing across actions present in the input prompt and the actions present in the knowledge base. In another example, the entity-action overlap score may be determined based on the cosine similarities of the action words, or the Jaccard's coefficient between the overlapping action words to the total words. Further factors may include word embedding similarity score, which calculates the similarity based on the semantic meaning of the words. The word embedding score, specifically, is computed by averaging the word vector distances between the input prompt and the knowledge artifacts.

Upon computing the similarity score, the intent identification module 220 identifies one or more appropriate knowledge artifacts that match the input prompt. The artifacts represent potential interpretations of the user's intent. The intent identification module 220 then determines the intent associated with the identified artifacts. This intent is a hypothesis about what the user is trying to achieve based on the input provided. In an embodiment, the intent identification module 220 further validates the identified intent using user feedback to ensure accuracy. That is, the intent identification module 220 provides the task name or the objective on an interface of the user device 102 to receive confirmation on the identified intent. If the user confirms or modifies the intent, the intent identification module 220 updates the predicted intent accordingly. The final output is a validated intent that reflects the user's original goal, based on the mapping, similarity assessment, and feedback validation processes.

In an embodiment, upon identifying the intent, the element identification module 230 predict a plurality of target elements applicable to the input prompt based on the predicted intent, wherein the plurality of target elements includes entities and actions. The element identification module 230 is configured to predict a plurality of target elements applicable to a given input prompt, leveraging predicted intent to determine appropriate tools and actions needed to perform the task. In an embodiment, the element identification module 230 in conjunction with the contextual association identification module 235, identifies and analyses pre-stored data, such as tools, historical prompts, and prompt elements, to predict which actions are most relevant for executing the task based on the intent. In an embodiment, the element identification module 230 may identify the plurality of target elements that are already present in the input prompt.

In an embodiment, the element identification module 230 identifies a plurality of pre-stored tools that are commonly used to perform tasks similar to the one the user intends to carry out. Such tools are identified by referencing a pre-stored tool table, which associates specific tools with particular tasks or task types. Once the relevant tools are identified, the contextual association identification module 235 retrieves a set of historical prompts associated with each tool from the knowledgebase 225. The historical prompts are essentially records of historical interactions where the tools were used, capturing the context in which they were applied. The historical prompts provide examples of past inputs and actions tied to the specific tools, offering insight into how the tools were previously/historically used for similar tasks. From the historical prompts, the contextual association identification module 235 extracts a variety of prompt elements that include, but are not limited to actions, parameters, and values related to tool operations. Such elements serve as the building blocks for understanding how the tools were applied and what specific details are necessary for completing the task.

Then the contextual association identification module 235 analyzes the extracted prompt elements to identify commonly occurring element types across similar tasks. The analysis helps the system understand which parameters, values, and actions are most frequently used, revealing patterns. Based on the identified patterns, the contextual association identification module 235 assigns value ranges to the commonly occurring element types, ensuring that the values reflect historical usage.

Further, the contextual association identification module 235 maps the task to the identified pre-stored tools. The mapping links each task to the most appropriate tools, based on the value ranges assigned to the commonly occurring element types. Each tool is also mapped to a set of historical prompts which includes the plurality of prompt elements, which are then used to understand how each tool may be applied to the current task. Furthermore, the contextual association identification module 235 generates a correlation set of prompt elements. The correlation set groups together the prompt elements that have been identified as inseparable for completing similar tasks. By defining these prompt elements as inseparable, the module ensures that all required components for the task are identified and correctly linked, improving the accuracy and efficiency of task completion. The correlation set helps optimize the task flow by highlighting the essential relationships between different prompt elements, making the system more intuitive and reliable in predicting the necessary steps to fulfill the user's input. Hence, the contextual association identification module 235 predicts the plurality of target elements applicable to the user input (input prompt) based on the predicted intent. The predicted plurality of target elements is fed to the simulation module 240.

In an alternative embodiment, the performance correlation module 245 correlates the performance of the predicted target elements. This step relies on the availability of recorded performance data (whether qualitative or quantitative) of the codes generated from past prompts, either during the test phase or operational phase. Hence, the performance correlation module 245 initially checks if the task performance of the predicted plurality of target elements are available. If available, then the performance correlation module 245 determines a correlation between the predicted plurality of target elements and a performance metric associated with the task by comparing the predicted plurality of target elements with a task performance of the prestored elements. In one implementation, the performance correlation module 245 uses techniques such as Pearson correlation, to establish relationship between each internal element present in a prompt and the performance outcomes for a given task. Then the performance correlation module 245 classifies each of the predicted plurality of target elements into at least one of an appropriate correlation set, a low-performance set, and a remaining element set based on the determined correlation. The appropriate correlation set indicate elements being positively correlated with the task performance, the low-performance set indicate elements being negatively correlated with the task performance, and the remaining elements set indicate elements being one of a neutral and minimal correlation level with the task performance.

In an embodiment of the present disclosure, the performance correlation module 245 executes the task by performing one of an addition, elimination, and modification of the predicted plurality of target elements based on the classification. Further, during the execution, the module 245 determines the impact of the predicted plurality of target elements on task performance, wherein the impact includes one of an efficiency level, an accuracy level, and relevance level of the predicted plurality of target elements. Then the performance correlation module 245 evaluates a performance of the predicted plurality of target elements based on the determined impact of the predicted plurality of target elements.

In an embodiment, if the recorded performance data of the codes generated from past prompts in not available, then the simulation module 240 validates an impact of the predicted plurality of target elements on a task performance using a simulation performance model. Initially, the simulation module 240 extracts a set of domain-specific documents from multiple external systems. The documents may be retrieved based on the predicted intent, which serves as the foundation for identifying relevant target elements. The simulation module 240 then identifies a plurality of target elements that are associated with the predicted intent by analysing the extracted documents. Once the target elements are identified, the simulation module 240 determines the correlation between the identified target elements and the predicted plurality of target elements. This correlation is critical to understanding how the predicted elements align with the actual elements identified from the documents. Using the correlation, the simulation module 240 simulates the task with each of the predicted plurality of target elements and the identified plurality of target elements in a virtual environment using the simulation performance model. In an embodiment, the task is simulated by performing one of an addition, an elimination and a modification of the predicted plurality of target elements and the identified plurality of target elements based on the correlation.

Further, the simulation module 240 uses the simulation results to determine the impact of the predicted and identified target elements on task performance. This impact is measured in terms of efficiency, accuracy, and relevance levels. The performance of the predicted target elements and the identified elements is then evaluated based on these metrics to arrive at a performance score. The performance score provides insights into how well the predicted elements align with the identified elements and helps to assess their overall effect on task performance. The simulation process, therefore, serves as a key method for validating the influence of the predicted target elements in the context of the task being performed. In one example, the performance score is determined based on a number or percentage of test cases that a generated code has passed. In another example, in a machine learning program generated by the system, the performance score may be the precision and recall generated (or F-score generated) in business applications by the code generated by the prompt. Hence, the performance score is dependent upon the application under consideration.

As described, the simulation module 240 and the performance correlation module 245 validates an impact of the predicted plurality of target elements on a task performance using the simulation performance model and a historical performance model, respectively.

Upon determining the performance scores of the predicted target elements and the identified elements, the prompt assistance module 250 determines a quality of the received user input (the input prompt) based on results of validation, wherein the quality is represented as a performance score of the plurality of elements in performing the task.

Further, the prompt assistance module 250 determines an appropriate set of target elements among the plurality of target elements for performing the task based on the performance score. Initially, the prompt assistance module 250 maps at least one element from the appropriate correlation set to the elements present in the input prompt. The mapped elements are then assigned as acceptable elements, which are considered suitable for further processing or inclusion in the task. Additionally, the prompt assistance module 250 identifies and maps elements from the low performance set that correlate with the input prompt. The elements that are mapped from this set are designated as potential performance degradation elements. Such mapping helps in recognizing elements that may negatively affect the overall performance of the task. Furthermore, the prompt assistance module 250 evaluates the appropriate correlation set to identify any elements that are absent in the user input, which could potentially improve the outcome. The absent elements are recommended as part of the appropriate set of target elements and are suggested for inclusion in the input prompt. For the remaining elements that do not fall into the categories of acceptable or low-performance sets, the prompt assistance module 250 such elements with the input prompt and classifies the mapped elements as acceptable. However, any remaining elements that are not part of the input prompt are classified as low-priority exploration elements. Such elements are considered secondary and may be explored, if necessary, but they do not immediately contribute to the task at hand. This systematic approach ensures that the most relevant and effective elements are prioritized, optimizing performance while minimizing potential degradation.

Then the prompt assistance module 250 generates a plurality of recommendations for the input prompt based on the appropriate set of target elements, and outputs the generated plurality of recommendations for the input prompt on a user interface of the user device, enabling the user to select one or more prompts as input prompt for receiving the response from the GenAI model.

In an embodiment, the prompt assistance module 250 determine patterns, templates, location of elements, priority and permutations and combinations of the appropriate set of target elements based on the determined input quality. Then the prompt assistance module 250 create a prompt configuration for the appropriate set of target elements, wherein the prompt configuration comprises the determined patterns, the templates, the location of elements, the priority and the permutations and combinations of the appropriate set of target elements. Further, the prompt assistance module 250 generate the plurality of recommendations for the input prompt based on the created prompt configuration.

Figure 3:
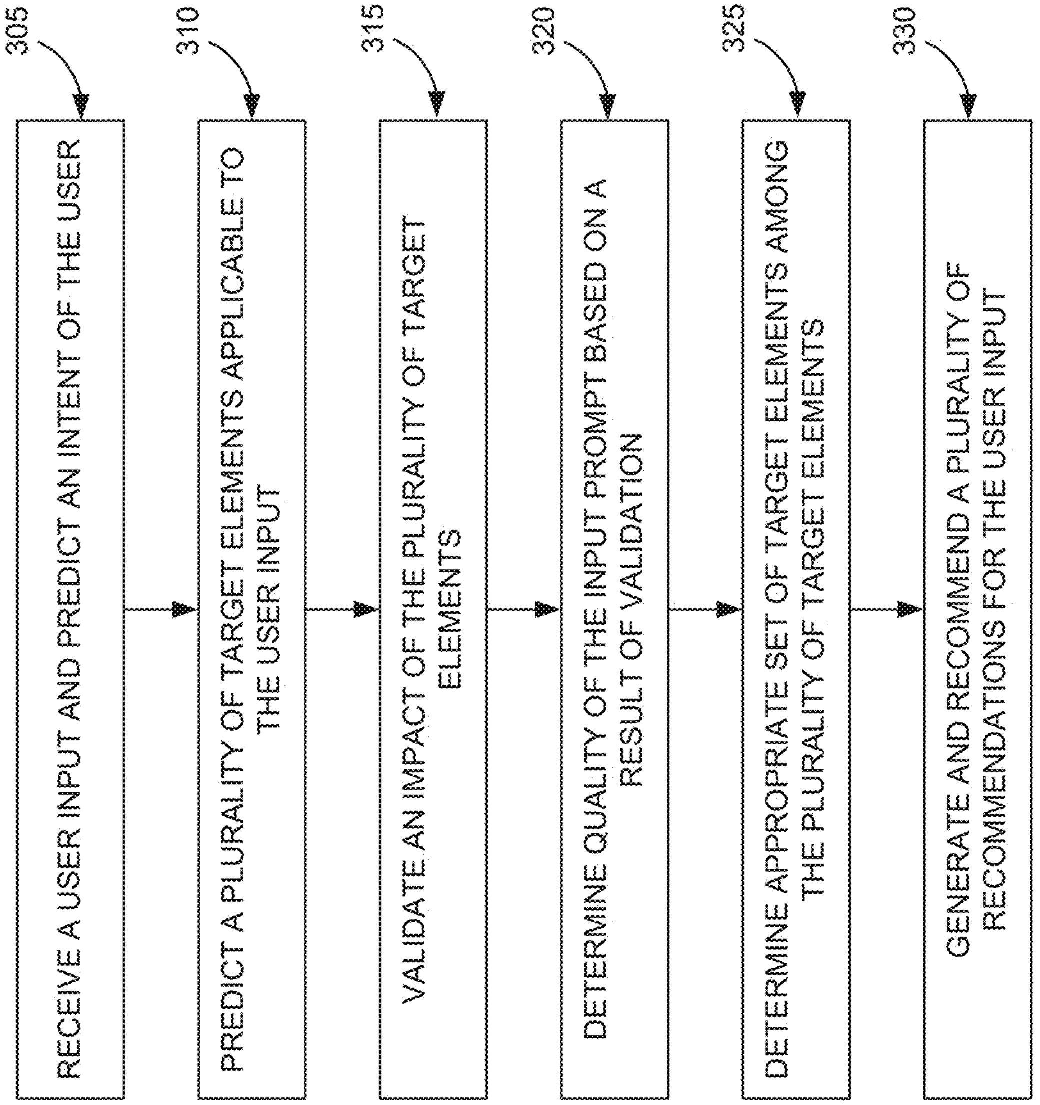
FIG. 3 is a flowchart illustrating the method of assessing and enhancing quality of prompts in generative ai-driven software coding, in accordance with an embodiment of the present disclosure.

FIG. 3 is a flowchart illustrating the method of assessing and enhancing quality of prompts in generative ai-driven software coding, in accordance with an embodiment of the present disclosure. At step 305, the system receives a user input and the intent identification module 220 predicts an intent of the user input. The user input refers to a prompt including at least one keyword associated with a task of generating a software code. An example user input (hereafter referred to as a prompt or input prompt) may be "Create a css file calc.css". Upon receiving the input prompt, the intent identification module 22 identifies the intent. The intent as described herein may refer to a task or objective, and hence identification of intent may include identification of task name or the objective or both the task name and the objective. In an embodiment, the intent is determined based on the at least one keyword, the task, and a context of the at least one keyword. The intent may be determined using the knowledge artifacts stored in the knowledgebase 225 and may include similarity assessment, similarity metric scoring, entity-action overlap scoring, etc., as described in the present disclosure.

At step 310, the element identification module 230 predicts a plurality of target elements applicable to the input prompt based on the predicted intent, wherein the plurality of target elements includes entities and actions. The element identification module 230 is configured to predict a plurality of target elements applicable to a given input prompt, leveraging predicted intent to determine appropriate tools and actions needed to perform the task. In an embodiment, the element identification module 230 in conjunction with the contextual association identification module 235, identifies and analyses pre-stored data, such as tools, historical prompts, and prompt elements, to predict which actions are most relevant for executing the task based on the intent. For example, for a given task "S" (determined software, methods, or actions used to execute the task software, methods, or actions used to execute the task at step 305), the element identification module 230 identifies individual tools "T" that have been used in the past to fulfill given task "S". The tools may include but are not limited to software, methods, or actions used to execute the task. Then for each identified tool "t" in "T", the element identification module 230 identifies all the prompts "P" issued in the past to operate the tool "t" for executing the task "S". Further, for each prompt "p" in "P", the element identification module 230 identifies all the elements "E" that exist. For example, for the task "css file creation" the target elements may include, "Action: Create", "File Type: css", "Location: demo/src/main/resources/static/", and "Body Background Color: #b1acb1".

Then the contextual association identification module 235 analyzes the extracted prompt elements to identify commonly occurring element types across similar tasks. The analysis helps the system understand which parameters, values, and actions are most frequently used, revealing patterns. Based on the identified patterns, the contextual association identification module 235 assigns value ranges to the commonly occurring element types, ensuring that the values reflect historical usage. In the above example of "css file creation", upon identifying many tasks that are semantically similar to "css file creation" or "create a css file" that exists in the knowledgebase 225, the contextual association identification module 235 identifies that the elements action, file type and location are always (or, almost always) present, and further, file type is always css, create is always action, while location varies, so for file type and action.

Furthermore, the contextual association identification module 235 generates a correlation set of prompt elements. The correlation set groups together the prompt elements that have been identified as inseparable for completing similar tasks. By defining these prompt elements as inseparable, the module ensures that all required components for the task are identified and correctly linked, improving the accuracy and efficiency of task completion. The correlation set helps optimize the task flow by highlighting the essential relationships between different prompt elements, making the system more intuitive and reliable in predicting the necessary steps to fulfill the user's input. Hence, the contextual association identification module 235 predicts the plurality of target elements applicable to the user input (input prompt) based on the predicted intent. The predicted plurality of target elements is fed to the simulation module 240. In the given example, contextual association identification module 235 maps the task "S" to the plurality of tools "T" and each tool "t" to prompts "P", each prompt constituting many elements "E". Hence produces a strong correlation set of the target elements.

Upon predicting the plurality of target elements applicable to the input prompt, the performance correlation module 245 or the simulation module 240 validates an impact of the plurality of target elements applicable to the input prompt as shown at step 315. In an embodiment of the present disclosure, the performance correlation module 245 correlates the performance of the predicted target elements. This step relies on the availability of recorded performance data (whether qualitative or quantitative) of the codes generated from past prompts, either during the test phase or operational phase. Hence, the performance correlation module 245 initially checks if the task performance of the predicted plurality of target elements are available. If available, then the performance correlation module 245 determines a correlation between the predicted plurality of target elements and a performance metric associated with the task by comparing the predicted plurality of target elements with a task performance of the prestored elements. In one implementation, the performance correlation module 245 uses techniques such as Pearson correlation, to establish relationship between each internal element present in a prompt and the performance outcomes for a given task. Then the performance correlation module 245 classifies each of the predicted plurality of target elements into at least one of an appropriate correlation set, a low-performance set, and a remaining element set based on the determined correlation. The appropriate correlation set indicate elements being positively correlated with the task performance, the low-performance set indicate elements being negatively correlated with the task performance, and the remaining elements set indicate elements being one of a neutral and minimal correlation level with the task performance.

In an embodiment of the present disclosure, the performance correlation module 245 executes the task by performing one of an addition, elimination, and modification of the predicted plurality of target elements based on the classification. Further, during the execution, the module 245 determines the impact of the predicted plurality of target elements on task performance, wherein the impact includes one of an efficiency level, an accuracy level, and relevance level of the predicted plurality of target elements. Then the performance correlation module 245 evaluates a performance of the predicted plurality of target elements based on the determined impact of the predicted plurality of target elements.

In an embodiment, if the recorded performance data of the codes generated from past prompts in not available, then the simulation module 240 validates an impact of the predicted plurality of target elements on a task performance using a simulation performance model. Initially, the simulation module 240 extracts a set of domain-specific documents from multiple external systems. The documents may be retrieved based on the predicted intent, which serves as the foundation for identifying relevant target elements. The simulation module 240 then identifies a plurality of target elements that are associated with the predicted intent by analysing the extracted documents. Once the target elements are identified, the simulation module 240 determines the correlation between the identified target elements and the predicted plurality of target elements. This correlation is critical to understanding how the predicted elements align with the actual elements identified from the documents. Using the correlation, the simulation module 240 simulates the task with each of the predicted plurality of target elements and the identified plurality of target elements in a virtual environment using the simulation performance model. In an embodiment, the task is simulated by performing one of an addition, an elimination and a modification of the predicted plurality of target elements and the identified plurality of target elements based on the correlation.

Further, the simulation module 240 uses the simulation results to determine the impact of the predicted and identified target elements on task performance. This impact is measured in terms of efficiency, accuracy, and relevance levels. The performance of the predicted target elements and the identified elements is then evaluated based on these metrics to arrive at a performance score. The performance score provides insights into how well the predicted elements align with the identified elements and helps to assess their overall effect on task performance. The simulation process, therefore, serves as a key method for validating the influence of the predicted target elements in the context of the task being performed.

As described, the simulation module 240 and the performance correlation module 245 validates an impact of the predicted plurality of target elements on a task performance using the simulation performance model and a historical performance model, respectively.

At step 320, the prompt assistance module 250 determines quality of the input prompt based on a result of validation. In an embodiment, upon determining the performance scores of the predicted target elements and the identified elements, the prompt assistance module 250 determines a quality of the received user input (the input prompt) based on results of validation, wherein the quality is represented as a performance score of the plurality of elements in performing the task.

At step 325, the system 200 determines an appropriate set of target elements among the plurality of target elements. In an embodiment, the prompt assistance module 250 determines an appropriate set of target elements among the plurality of target elements for performing the task based on the performance score. Initially, the prompt assistance module 250 maps at least one element from the appropriate correlation set to the elements present in the input prompt. The mapped elements are then assigned as acceptable elements, which are considered suitable for further processing or inclusion in the task. Additionally, the prompt assistance module 250 identifies and maps elements from the low performance set that correlate with the input prompt. The elements that are mapped from this set are designated as potential performance degradation elements. Such mapping helps in recognizing elements that may negatively affect the overall performance of the task. Furthermore, the prompt assistance module 250 evaluates the appropriate correlation set to identify any elements that are absent in the user input, which could potentially improve the outcome. The absent elements are recommended as part of the appropriate set of target elements and are suggested for inclusion in the input prompt. However, any remaining elements that are not part of the input prompt are classified as low-priority exploration elements. Such elements are considered secondary and may be explored, if necessary, but they do not immediately contribute to the task at hand. This systematic approach ensures that the most relevant and effective elements are prioritized, optimizing performance while minimizing potential degradation.

At step 330, the system 200 generates and recommends a plurality of recommendations for the user input. In an embodiment, the prompt assistance module 250 generates a plurality of recommendations for the input prompt based on the appropriate set of target elements, and outputs the generated plurality of recommendations for the input prompt on a user interface of the user device, enabling the user to select one or more prompts as input prompt for receiving the response from the GenAI model.

In an embodiment, the prompt assistance module 250 determine patterns, templates, location of elements, priority, and permutations and combinations of the appropriate set of target elements based on the determined input quality. Then the prompt assistance module 250 create a prompt configuration for the appropriate set of target elements, wherein the prompt configuration comprises the determined patterns, the templates, the location of elements, the priority and the permutations and combinations of the appropriate set of target elements. Further, the prompt assistance module 250 generate the plurality of recommendations for the input prompt based on the created prompt configuration. Hence, the recommendations may include, but are not limited to, one or more target elements that are necessary for enhancing the quality of the input prompt and hence for enhancing the quality of the response generated by the GenAI system.

As described, the system and method disclosed in the present disclosure assesses and enhances the quality of prompts in generative ai-driven software coding. For example, considering an input prompt for creating a css file, the prompt may include "Create a css file calc.css in an already existing location: demo/src/main/resources/static/ with body background color as #b1acb1 and #container as width: 200 px; align-items: center; justify-content: center; padding: 8 px 8 px20 px8 px; margin: 20 px auto; background-color: #faf7fbf1; border-radius: 4 px". Upon receiving the prompt, the system identifies the intent of the prompt, which is "build a web service", in this example. Then the system identifies the plurality of target elements that are used to configure the input prompt. In this example, the target elements (set C1), which define entities and actions, includes:

Action: Create
File type: css
Location: demo/src/main/resources/static/
Body background color: #b1acb1
Container width: 200 px
Container alignment: center
Container justify-content: center
Container padding: 8 px8 px20 px8 px
Container margin: 20 px auto
Container background color: #faf7fbf1
Container border radius: 4 px Further, the system may identify a plurality of target elements used to perform the similar task. Such identified plurality of target elements (set C2 for example) may include:

Action: create
File type: css
Location: demo/src/main/resources/static/
Body background color: #b1acb1
Container width: 200 px Furthermore, the system may identify a plurality of target elements used to perform the similar task. The plurality of target elements (C3) may include:

All the Elements of C1, and
Content-visibility: auto

Furthermore, the system may identify a plurality of target elements used to perform the similar task. The plurality of target elements (C4) may include:

All the Elements of C1, Expect-Container Width: 200 px, and
Content-visibility: Auto In the above example, the frequent element-set (strong correlation set) found by the association mining includes the elements (Action, File type, Location, Body, Container width). By benchmarking testing performance (form factor and device testing), it is observed that, in the instances where the Container alignment was specified, the test outcomes were not good (less user star ratings, etc.), and hence, this element is moved to the low-performance list. The Content-visibility element as well as elements such as Container alignment, Container justify-content, Container padding, Container margin, Container background color, and Container border radius, all are moved to the other elements list. Then the mapping is performed and the element Content-visibility (found in C3 in this example) is suggested to the user as a candidate element for explore as the element does not appear in the input prompt from the user. In case a web service project was not found in the internal knowledge base and externally, then a simulation experiment would have been carried out by the system by including the different configurations, starting from C1 (the user-given input prompt) but carrying over to additional configurations, that could have been randomly done, or by mining CSS programming domain knowledge and looking for CSS program element commonalities.

As described, the system and method assesses the quality of a given prompt for a given task, and/or with respect to a given GenAI engine, such that, it would address specific scenarios by comparing across multiple possibilities of configuration of the prompt, and for each possibility of configuration of the prompt, estimates the quality of the prompt configuration, thereby choosing the best configuration of the prompt and recommending it to the user, or guiding the user to configure an optimal prompt. Further, the proposed system and method enables efficient prompt quality assessment without going through an expensive and time-consuming cycles of execution and testing which often involve extensive tests and evaluations.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in a generic classical processor system and a quantum computing system.

Figure 4:
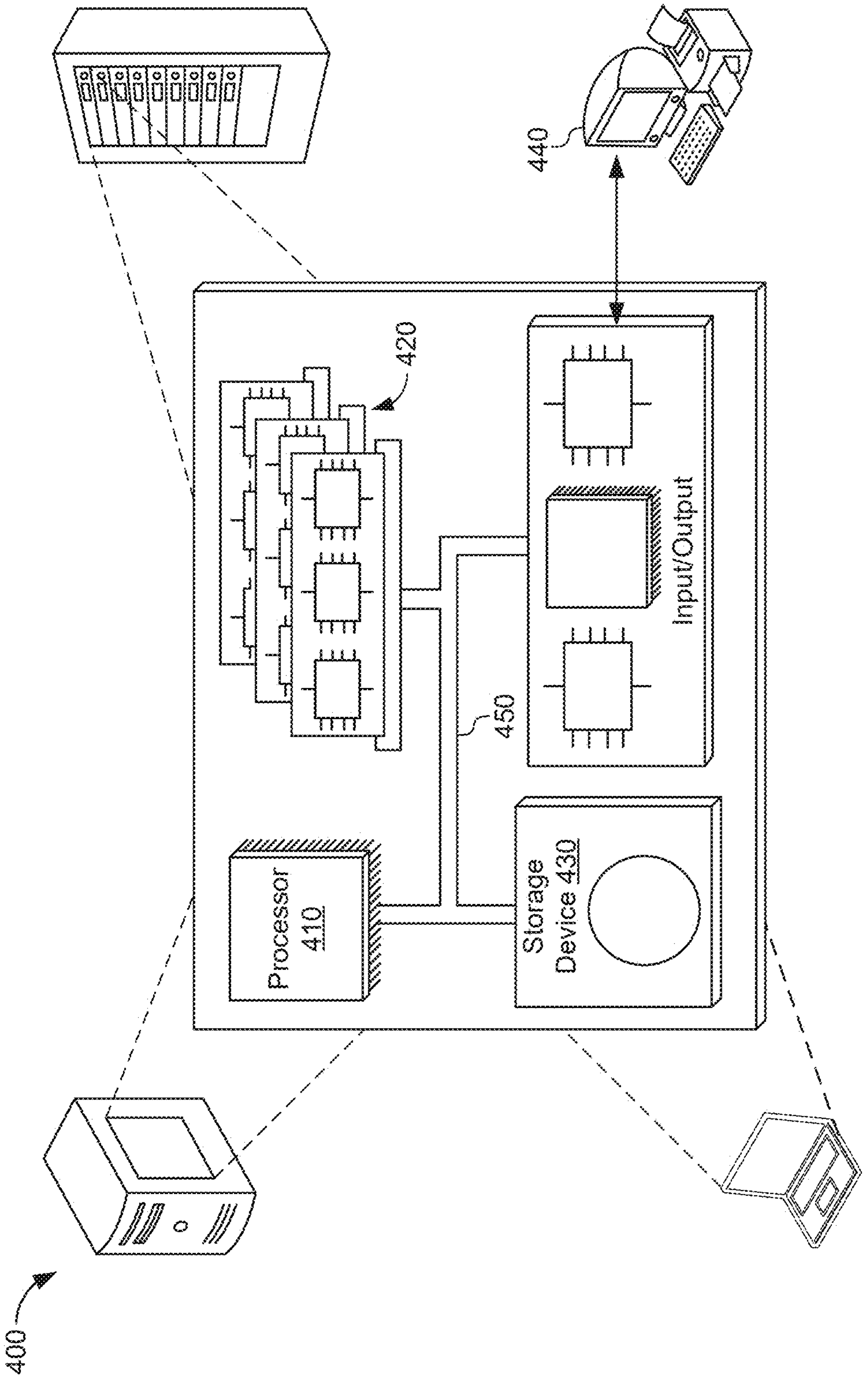
FIG. 4 illustrates an example computer system used to implement the system for assessing and enhancing quality of prompts in generative AI-driven software coding.

FIG. 4 illustrates an example computer system used to implement the system for assessing and enhancing quality of prompts in generative AI-driven software coding. The system 400 is intended to represent various forms of digital computers, workstations, servers, blade servers, mainframes, and other appropriate computers. The components shown, their connections and relationships, and their functions, are exemplary only, and do not limit implementations of the inventions described and/or claimed in this document. The system 400 includes a processor 410, a memory 420, a storage device 430, and an input/output device 440. Each of the components 410, 420, 430, and 440 are interconnected using a system bus 450. The processor 410 may be enabled for processing instructions for execution within the system 400. In one implementation, the processor 410 is a single-threaded processor. In another implementation, the processor 410 is a multi-threaded processor. The processor 410 may be enabled for processing instructions stored in the memory 420 or on the storage device 430 to display graphical information for a user interface on the input/output device 440. In one implementation, the memory 420 is a computer-readable medium. In one implementation, the memory 420 is a volatile memory unit. In another implementation, the memory 420 is a non-volatile memory unit. The storage device 430 may be enabled for providing mass storage for the system 400. In one implementation, the storage device 430 is a computer-readable medium. In various different implementations, the storage device 430 may be a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:

a processor; and a memory communicably coupled to the processor, wherein the memory comprises processor-executable instructions which, when executed by the processor, cause the processor to:

receive a user input from a user via a conversational artificial intelligence interface, wherein the user input comprises at least one keyword associated with a task;

predict an intent of the user input based on the at least one keyword, the task, and a context of the at least one keyword;

predict a plurality of target elements applicable to the user input based on the predicted intent, wherein the plurality of target elements comprise entities and actions in the user input;

validate an impact of the predicted plurality of target elements on a task performance using a simulation performance model and a historical performance model;

determine an input a quality of the received user input based on results of validation, wherein the input quality is represented as a performance score of the plurality of elements in performing the task;

determine an appropriate set of target elements among the plurality of target elements for performing the task based on the performance score;

generate a plurality of recommendations for the user input based on the appropriate set of target elements; and output the generated plurality of recommendations for the user input on a user interface of a user device.

2. The system of claim 1, wherein to predict the plurality of target elements applicable to the user input based on the predicted intent, the processor is configured to:

identify a plurality of pre-stored tools used for performing tasks similar to the task based on a prestored tool table;

retrieve a plurality of historical prompts associated with each of the identified plurality of pre-stored tools;

extract a plurality of prompt elements from the retrieved historical prompts, wherein each of the plurality of prompt elements correspond to an action, a parameter, and a value related to a tool operation for the task;

analyze the plurality of prompt elements to identify commonly occurring element types for similar tasks;

assign a plurality of value ranges to the identified commonly occurring element types based on a specific historical usage;

map the task to the identified plurality of pre-stored tools based on the assigned plurality of value ranges, wherein each tool is mapped to a corresponding plurality of historical prompts and each historical prompt comprises the plurality of prompt elements; and generate a correlation set of prompt elements based on the identified commonly occurring element types within similar prompts, wherein the correlation set defines a group of elements indicated as inseparable for the task.

3. The system of claim 2, wherein the processor is configured to:

identify at least one appropriate tool from among the plurality of pre-stored tools for executing the task based on a historical success rate of the appropriate tool in performing similar tasks; and generate an updated correlation set of the prompt elements based on the identified at least one appropriate tool, wherein the updated correlation set of prompt elements defines the group of elements indicated as inseparable for the task.

4. The system of claim 1, wherein to predict the intent of the user input based on the at least one keyword, the task, and the context of the at least one keyword, the processor is configured to:

map the at least one keyword, the task, and the context of the at least one keyword in the received user input with corresponding knowledge artifacts pre-stored in one of an internal knowledge database and an external knowledge database, wherein the corresponding knowledge artifacts comprises at least one of a keyword, a task and a context;

determine a similarity between the user input and the corresponding knowledge artifacts based on the mapping;

compute at least one similarity metric score for the user input based on the determined similarity, wherein the similarity metric score comprises at least one of an entity-action overlap score, and a word embedding similarity score, wherein the word embedding similarity score is computed based on an average word vector distances between the user input and the corresponding knowledge artifacts;

identify at least one appropriate knowledge artifact matching with the received user input based on the computed at least one similarity metric score;

determine the intent associated with the identified at least one appropriate knowledge artifact;

validate the determined intent associated with the identified at least one appropriate knowledge artifact based on user feedback; and output the intent as a final intent of the user input based on results of validation.

5. The system of claim 1, wherein to validate the impact of the predicted plurality of target elements on the task performance using the simulation performance model, the processor is configured to:

determine whether the task performance of the predicted plurality of target elements are prestored;

determine a correlation between the predicted plurality of target elements and a performance metric associated with the task by comparing the predicted plurality of target elements with a task performance of the pre-stored elements;

classify each of the predicted plurality of target elements into at least one of a appropriate correlation set, a low-performance set, and a remaining elements set based on the determined correlation, wherein the appropriate correlation set indicate elements being positively correlated with the task performance, and the low-performance set indicate elements being negatively correlated with the task performance, and wherein the remaining elements set indicate elements being one of a neutral and minimal correlation level with the task performance;

execute the task by performing one of an addition, elimination, and modification of the predicted plurality of target elements based on the classification;

determine the impact of the predicted plurality of target elements on task performance during the execution of the task, wherein the impact comprises one of an efficiency level, an accuracy level, and relevance level of the predicted plurality of target elements; and evaluate a performance of the predicted plurality of target elements based on the determined impact of the predicted plurality of target elements.

6. The system of claim 1, wherein to validate the impact of the predicted plurality of target elements on the task performance using the simulation performance model, the processor is configured to:

extract a plurality of domain-specific documents from a plurality of external systems based on the predicted intent;

identify plurality of target elements associated with the predicted intent based on the extracted plurality of domain-specific documents;

determine a correlation between the identified plurality of target elements and the predicted plurality of target elements;

simulate the task with each of the predicted plurality of target elements and the identified plurality of target elements in a virtual environment using the simulation performance model, wherein the task is simulated by performing one of an addition, an elimination and a modification of the predicted plurality of target elements and the identified plurality of target elements based on the correlation;

determine the impact of the predicted plurality of target elements and the identified plurality of target elements on task performance based on results of simulation, wherein the impact comprises one of an efficiency level, an accuracy level, and a relevance level of the predicted plurality of target elements and the identified plurality of target elements; and evaluate a performance of the predicted plurality of target elements and the identified plurality of target elements based on the determined impact.

7. The system of claim 1, wherein to determine the input quality of the received user input based on results of validation, the processor is configured to:

generate the performance score for each of the plurality of elements in performing the task, wherein the task is performed with presence, absence, and modification of the predicted plurality of target elements in the user input; and determine the input quality of the received user input based on the generated performance score.

8. The system of claim 1, wherein to determine the appropriate set of target elements among the plurality of target elements for performing the task based on the performance score, the processor is configured to:

map at least one element in an appropriate correlation set with elements in the user input;

assign the mapped elements in the appropriate correlation set as acceptable elements;

map at least one element in a low-performance set that with the elements in the user input;

assign the mapped elements in the low-performance list as potential performance degradation elements;

determine elements in the appropriate correlation set absent in the user input;

recommend the determined elements in the appropriate correlation set absent in the user input as appropriate set of target elements for inclusion in the user input;

map elements in the remaining elements set with the elements in the user input;

assign the mapped elements in the remaining elements set as the acceptable elements; and assign the elements of the remaining elements set absent in the user input as low-priority exploration elements.

9. The system of claim 1, wherein to generate the plurality of recommendations for the prompt configuration based on the appropriate set of target elements, the processor is configured to:

determine patterns, templates, location of elements, priority and permutations and combinations of the appropriate set of target elements based on the determined input quality;

create a prompt configuration for the appropriate set of target elements, wherein the prompt configuration comprises the determined patterns, the templates, the location of elements, the priority and the permutations and combinations of the appropriate set of target elements; and generate the plurality of recommendations for the user input based on the created prompt configuration.

10. A method comprising:

receiving, by a processor, a user input from a user via a conversational artificial intelligence interface, wherein the user input comprises at least one keyword associated with a task;

predicting, by the processor, an intent of the user input based on the at least one keyword, the task, and a context of the at least one keyword;

predicting, by the processor, a plurality of target elements applicable to the user input based on the predicted intent, wherein the plurality of elements comprise entities and actions in the user input;

validating, by the processor, an impact of the predicted plurality of target elements on a task performance using a simulation performance model and a historical performance model;

determining, by the processor, an input quality of the received user input based on results of validation, wherein the input quality comprises a performance score of the plurality of elements in performing the task;

determining, by the processor, an appropriate set of target elements among the plurality of target elements for performing the task based on the performance score;

generating, by the processor, a plurality of recommendations for the user input based on the appropriate set of target elements; and outputting, by the processor, the generated plurality of recommendations for the user input on a user interface of a user device.

11. The method of claim 10, wherein predicting the plurality of target elements applicable to the user input based on the predicted intent comprises:

identifying, by the processor, a plurality of pre-stored tools used for performing tasks similar to the task based on a prestored tool table;

retrieving, by the processor, a plurality of historical prompts associated with each of the identified plurality of pre-stored tools;

extracting, by the processor, a plurality of prompt elements from the retrieved historical prompts, wherein each of the plurality of prompt elements correspond to an action, a parameter, and a value related to a tool operation for the task;

analyzing, by the processor, the plurality of prompt elements to identify commonly occurring element types for similar tasks;

assigning, by the processor, a plurality of value ranges to the identified commonly occurring element types based on specific historical usage;

mapping, by the processor, the task to the identified plurality of pre-stored tools based on the assigned plurality of value ranges, wherein each tool is mapped to a corresponding plurality of historical prompts and each historical prompt comprises the plurality of prompt elements; and generating, by the processor, a correlation set of prompt elements based on the identified commonly occurring element types within similar prompts, wherein the correlation set defines a group of elements indicated as inseparable for the task.

12. The method of claim 11, further comprising:

identifying, by the processor, at least one appropriate tool from among the plurality of pre-stored tools for executing the task based on a historical success rate of the appropriate tool in performing similar tasks;

generating, by the processor, an updated correlation set of prompt elements based on the identified at least one appropriate tool, wherein the updated correlation set of prompt elements defines a group of elements indicated as inseparable for the task.

13. The method of claim 10, wherein predicting the intent of the user input based on the at least one keyword, the task, and the context of the at least one keyword comprises:

mapping, by the processor, the at least one keyword, the task, and the context of the at least one keyword in the received user input with a corresponding knowledge artifact pre-stored in one of an internal knowledge database and an external knowledge database, wherein the corresponding knowledge artifacts comprises at least one of a keyword, a task and a context;

determining, by the processor, a similarity between the user input and the corresponding knowledge artifacts based on the mapping;

computing, by the processor, at least one similarity metric score for the user input based on the determined similarity, wherein the similarity metric score comprises at least one of an entity-action overlap score, and a word embedding similarity score, wherein the word embedding similarity score is computed based on an average word vector distances between the user input and the corresponding knowledge artifacts;

identifying, by the processor, at least one appropriate knowledge artifact matching with the received user input based on the computed at least one similarity metric score;

determining, by the processor, the intent associated with the identified at least one appropriate knowledge artifact;

validating, by the processor, the determined intent associated with the identified at least one appropriate knowledge artifact based on user feedback; and outputting, by the processor, the intent as a final intent of the user input based on results of validation.

14. The method of claim 10, wherein validating the impact of the predicted plurality of target elements on the task performance using the simulation performance model comprises:

determining, by the processor, whether the task performance of the predicted plurality of target elements are prestored;

determining, by the processor, a correlation between the predicted plurality of target elements and a performance metric associated with the task by comparing the predicted plurality of target elements with a task performance of the prestored elements;

classifying, by the processor, each of the predicted plurality of target elements into at least one of an appropriate correlation set, a low-performance set, and a remaining elements set based on the determined correlation, wherein the appropriate correlation set indicate elements being positively correlated with the task performance, and the low-performance set indicate elements being negatively correlated with the task performance, and wherein the remaining elements set indicate elements being one of a neutral and minimal correlation level with the task performance;

executing, by the processor, the task by performing one of an addition, elimination, and modification of the predicted plurality of target elements based on the classification;

determining, by the processor, the impact of the predicted plurality of target elements on task performance during the execution of the task, wherein the impact comprises one of an efficiency level, an accuracy level, and relevance level of the predicted plurality of target elements; and evaluating, by the processor, performance of the predicted plurality of target elements based on the determined impact of the predicted plurality of target elements.

15. The method of claim 10, wherein validating the impact of the predicted plurality of target elements on the task performance using the simulation performance model comprises:

extracting, by the processor, a plurality of domain-specific documents from a plurality of external systems based on the predicted intent;

identifying, by the processor, plurality of target elements associated with the predicted intent based on the extracted plurality of domain-specific documents;

determining, by the processor, a correlation between the identified plurality of target elements and the predicted plurality of target elements;

simulating, by the processor, the task with each of the predicted plurality of target elements and the identified plurality of target elements in a virtual environment using the simulation performance model, wherein the task is simulated by performing one of an addition, an elimination and a modification of the predicted plurality of target elements and the identified plurality of target elements based on the correlation;

determining, by the processor, the impact of the predicted plurality of target elements and the identified plurality of target elements on task performance based on results of simulation, wherein the impact comprises one of an efficiency level, an accuracy level, and relevance level of the predicted plurality of target elements and the identified plurality of target elements; and evaluating, by the processor, performance of the predicted plurality of target elements and the identified plurality of target elements based on the determined impact.

16. The method of claim 10, wherein determining the input quality of the received user input based on results of validation comprises:

generating, by the processor, a performance score for each of the plurality of elements in performing the task, wherein the task is performed with presence, absence, and modification of the predicted plurality of target elements in the user input; and determining, by the processor, the input quality of the received user input based on generated performance score.

17. The method of claim 10, wherein determining the appropriate set of target elements among the plurality of target elements for performing the task based on the performance score comprises:

mapping, by the processor, elements in an appropriate correlation set with elements in the user input;

assigning, by the processor, the mapped elements in the appropriate correlation set as acceptable elements;

mapping, by the processor, elements in a low-performance set that with the elements in the user input;

assigning, by the processor, the mapped elements in the low-performance list as potential performance degradation elements;

determining, by the processor, elements in the appropriate correlation set absent in the user input;

recommending, by the processor, the determined elements in the appropriate correlation set absent in the user input as appropriate set of target elements for inclusion in the user input;

mapping, by the processor, elements in the remaining elements set with the elements in the user input;

assigning, by the processor, the mapped elements in the remaining elements set as the acceptable elements; and assigning, by the processor, the elements of the remaining elements set absent in the user input as low-priority exploration elements.

18. The method of claim 10, wherein generating the plurality of recommendations for the prompt configuration based on the appropriate set of target elements comprises:

determining, by the processor, patterns, templates, location of elements, priority and permutations and combinations of the appropriate set of target elements based on the determined input quality;

creating, by the processor, a prompt configuration for the appropriate set of target elements, wherein the prompt configuration comprises the determined patterns, the templates, the location of elements, the priority and the permutations and combinations of the appropriate set of target elements; and generating, by the processor, the plurality of recommendations for the user input based on the created prompt configuration.

19. A non-transitory computer readable medium comprising a processor-executable instructions that cause a processor to:

receive a user input from a user via a conversational artificial intelligence interface, wherein the user input comprises at least one keyword associated with a task;

predict an intent of the user input based on the at least one keyword, the task, and a context of the at least one keyword;

predict a plurality of target elements applicable to the user input based on the predicted intent, wherein the plurality of elements comprise entities and actions in the user input;

validate an impact of the predicted plurality of target elements on a task performance using a simulation performance model and a historical performance model;

determine an input quality of the received user input based on results of validation, wherein the input quality comprises a performance score of the plurality of elements in performing the task;

determine an appropriate set of target elements among the plurality of target elements for performing the task based on the performance score;

generate a plurality of recommendations for the user input based on the appropriate set of target elements; and output the generated plurality of recommendations for the user input on a user interface of a user device.

20. The non-transitory computer readable medium of claim 19, wherein to predict the plurality of target elements applicable to the user input based on the predicted intent, the processor-executable instructions cause the processor to:

identify a plurality of pre-stored tools used for performing tasks similar to the task based on a prestored tool table;

retrieve a plurality of historical prompts associated with each of the identified plurality of pre-stored tools;

extract a plurality of prompt elements from the retrieved historical prompts, wherein each of the plurality of prompt elements correspond to an action, a parameter, and a value related to a tool operation for the task;

analyze the plurality of prompt elements to identify commonly occurring element types for similar tasks;

assign a plurality of value ranges to the identified commonly occurring element types based on specific historical usage;

map the task to the identified plurality of pre-stored tools, wherein each tool is mapped to a corresponding plurality of historical prompts and each historical prompt comprises the plurality of prompt elements; and generate a correlation set of prompt elements based on the identified commonly occurring element types within similar prompts, wherein the correlation set defines a group of elements indicated as inseparable for the task.

* * * * *